(12) United States Patent
Whittaker

(10) Patent No.: US 6,296,222 B1
(45) Date of Patent: Oct. 2, 2001

(54) MACHINERY MOUNT ANCHOR BASE FIXTURE

(75) Inventor: Wayne H. Whittaker, Horton, MI (US)

(73) Assignee: Unisorb Inc., Jackson, MI (US)

(*) Notice: Subject to any disclaimer, the term of this patent is extended or adjusted under 35 U.S.C. 154(b) by 0 days.

(21) Appl. No.: 09/579,422

(22) Filed: May 26, 2000

(51) Int. Cl.[7] ................................................. F16M 1/00
(52) U.S. Cl. ................................................. 248/650; 248/678
(58) Field of Search .................................. 248/650, 678, 248/680, 646, 544, 545, 547; 52/704, 167.2, 169.9; 606/96

(56) References Cited

U.S. PATENT DOCUMENTS

| | | | |
|---|---|---|---|
| 4,029,275 | * | 6/1977 | Erismann ............................. 248/680 |
| 4,061,298 | * | 12/1977 | Kober ................................. 248/677 |
| 4,250,681 | * | 2/1981 | Helderman ............................. 52/704 |
| 5,000,416 | * | 3/1991 | Fantasia ............................... 248/650 |
| 5,833,693 | * | 11/1998 | Abrahami ............................... 606/96 |
| 5,842,678 | * | 12/1998 | Svejkovsky ............................ 248/650 |
| 5,971,349 | * | 10/1999 | Whittaker ............................. 248/678 |

* cited by examiner

Primary Examiner—Ramon O. Ramirez
Assistant Examiner—Tan Le
(74) Attorney, Agent, or Firm—Young & Basile, P.C.

(57) ABSTRACT

A fixture for guiding drills for forming holes to receive fasteners for affixing a machinery mount anchor in position. Such fasteners are usually obliquely related to the vertical and the drill guide fixture is firmly supported upon the machinery mount anchor base and includes drill guides angularly related to the vertical to permit fastener holes to be accurately drilled in the support surface in alignment with the anchor base fastener openings. Threaded retainers and angle producing elements permit the drill fixture to be temporarily firmly positioned on the machinery mounting base during drilling.

8 Claims, 3 Drawing Sheets

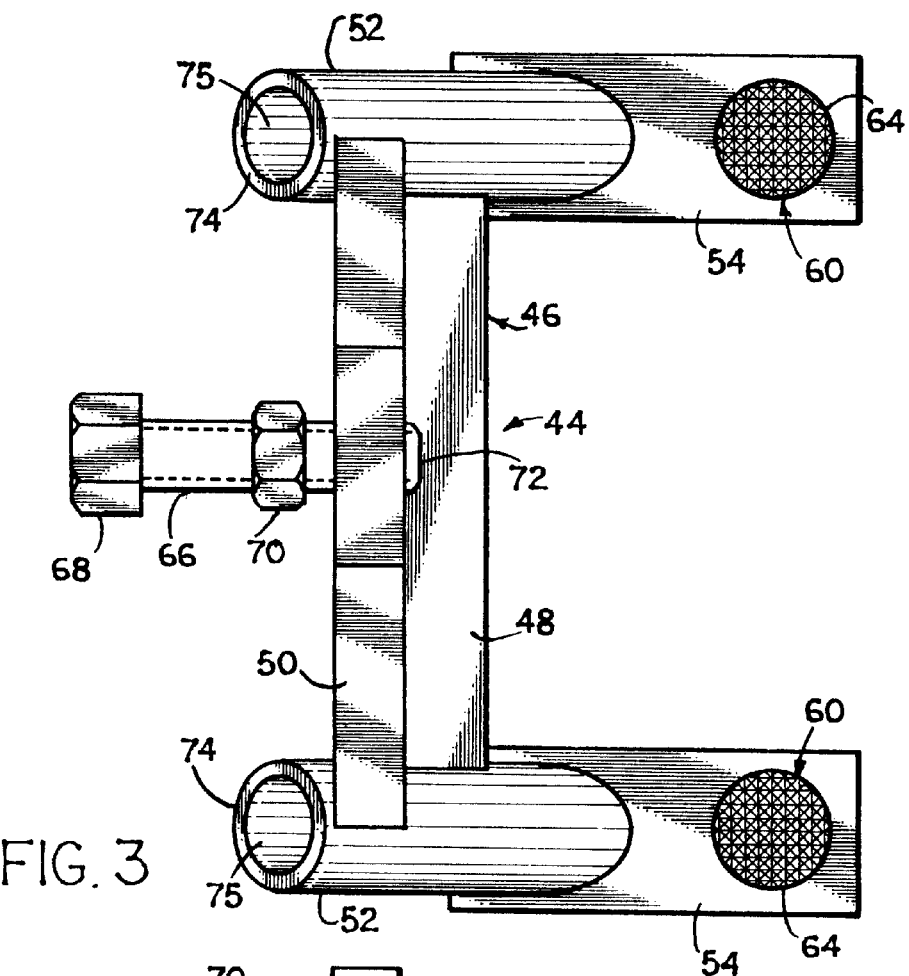
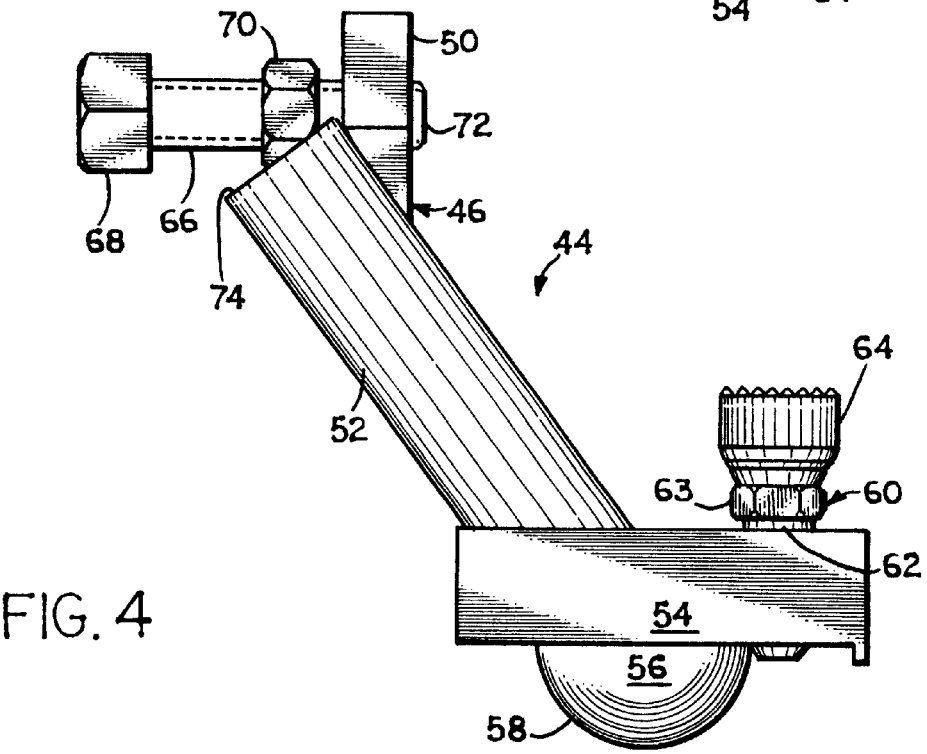

MACHINERY MOUNT ANCHOR BASE FIXTURE

BACKGROUND OF THE INVENTION

1. Field of the Invention

The invention pertains to drill guide fixtures for machinery mount anchor bases wherein fastener receiving holes may be accurately drilled obliquely related to the vertical.

2. Description of the Related Art

Heavy machinery such as presses, machine tools, turbines, generators, rolling machines, and the like, are subject to vibration. Further, with heavy machines of this type, it is important that the weight of the machine be evenly distributed over its base in order to maintain the integrity and accuracy of ways and other alignments. As the floor or foundation for such heavy equipment may contain vertical inaccuracies, and hence, unevenly support the equipment, it is common to use machinery mounting anchor bases located at critical locations along the machine base. Such mounting bases usually include adjustable vertical support elements whereby the anchor base can be vertically adjusted so that the machine will be equally supported at its support locations. Machinery mount anchor bases of the type used are sold by the assignee under the trademark FIXATOR and are shown in the assignee's U.S. Pat. No. 5,971,349.

Machinery mount anchor bases of the FIXATOR type will be mounted below the machine base, and access to the anchor is limited by the configuration of the machine base. As it is normally advisable to permanently affix the anchor base to the supporting surface, fasteners are normally used to affix the anchor base to the supporting floor or foundation. However, because of the presence of the machine base limiting access to the machinery mount anchor base, it is difficult to accurately locate such anchor fasteners, and further, because it is usually necessary to obliquely relate the fasteners to the vertical due to the limited access to the anchor bases, the difficulty in drilling accurate non-vertical holes in the supporting surface is compounded. Prior to the existence of the instant invention, apparatus has not been available for accurately drilling the oblique fastener holes for heavy machines utilizing machinery mounting anchor bases and hold-down adapters as shown in U.S. Pat. No. 5,971,349 have had to be used.

OBJECTS OF THE INVENTION

It is an object of the invention to provide a drill guide fixture for use with machinery mounting anchor bases wherein anchor fastener receiving holes may be accurately drilled within a supporting surface even though obliquely related to the vertical.

Another object of the invention is to provide a drill guide fixture for drilling fastener receiving holes for machinery mounting anchor bases wherein the fixture is supported upon the base during use, may be accurately located and adjusted while on the anchor base, and may be easily removed from the anchor base once the fastener receiving holes are drilled.

It is an additional object of the invention to provide a drill guide fixture for drilling fastener receiving holes for machinery mounting anchor bases wherein the fixture is economical to manufacture, easy to use, firmly positioned while in use, and readily removed from the anchor base with a minimum of mechanical skills.

SUMMARY OF THE INVENTION

Heavy duty machinery mounting anchor bases such as the FIXATOR and as shown in U.S. Pat. No. 5,971,349 include a vertically adjustable pedestal mounted upon a base having fastener receiving openings located upon opposite sides of the pedestal. The fastener receiving openings are preferably recessed for accommodating the anchor base fasteners, and such recesses receive self-adjusting fastener engaging balls or guides to uniformly distribute the fastener forces upon the anchor base.

The drill guide fitting in accord with the invention includes a frame having projections of a semi-spherical configuration for being received within the anchor base fastener receiving opening recesses. Accordingly, the fixture frame is capable of pivoting relative to the associated anchor base about the projections prior to the fixture being locked in its operative position.

The drill guide fixture also includes a pair of substantially vertically oriented retainers of a threaded shaft configuration capable of being adjusted to engage the underside of the machine being supported and thereby produce a downward force on the fixture to maintain the fixture projections within the anchor base recesses. Further, the fixture frame includes angular adjustment means in the form of a threaded shaft which engages the machine being supported at a position remote from the retainers and on the opposite side of a vertical plane centrally extending through the projections with respect to the retainers. Preferably, the adjustment of the angular producing shaft is substantially perpendicular to the aforedescribed vertical plane. Accordingly, upon adjustment of the length of the retainers and the angular shaft, the angular rotation of the fixture frame in the anchor base recesses is possible to produce a predetermined angular orientation of the fixture frame to the vertical.

The fixture frame includes a pair of drill guide tubes having open upper and lower ends. The guide tubes are in alignment with the frame projections so that the bores of the tube extend through the projections and the lower ends align with the fastener receiving openings formed in the anchor base. Accordingly, once the fixture frame is adjusted as desired, and the retainers and angle adjustment tightened so that the fixture is firmly locked in position on the anchor base, the obliquely oriented drill guide tubes may be used to guide drills inserted into the open end of the guide tubes and permit the supporting surface for the anchor base to be drilled for receipt of the anchor base fasteners, which usually consists of high strength screws or threaded lags.

Due to the limited access clearance to the anchor bases as described above, the length of the drill guide tubes will normally be obliquely related to the vertical. However, the length of the drill guide tubes is sufficient to accurately guide the drills during operation and even though the drills will be entering the supporting surface at an oblique angle to the vertical, the drilling operation will be accurately achieved in order to receive the anchor base fasteners.

Once drilling of the fastener receiving holes in the supporting surface is achieved, the retainers and fixture angle lock are backed off, or retracted, and it is possible to fully remove the fixture from the anchor base providing access to the anchor base fastener receiving openings and the fasteners inserted into the openings and threaded into the newly drilled holes in the supporting surface.

The practice of the invention permits anchor base fasteners to be accurately received within properly dimensioned holes in the supporting surface insuring proper anchor base retention and superior shaped holes are achieved as compared with the oversized and misaligned holes which result when a drill fixture is not employed.

BRIEF DESCRIPTION OF THE DRAWINGS

The aforementioned objects and advantages of the invention will be appreciated from the following description and accompanying drawings wherein:

FIG. 3 is a top plan view of the anchor base drill fixture in accord with the invention, FIG. 4 is a side elevational view of the drill fixture as taken from the bottom of FIG. 3.

DESCRIPTION OF THE PREFERRED EMBODIMENT

Figure 1:
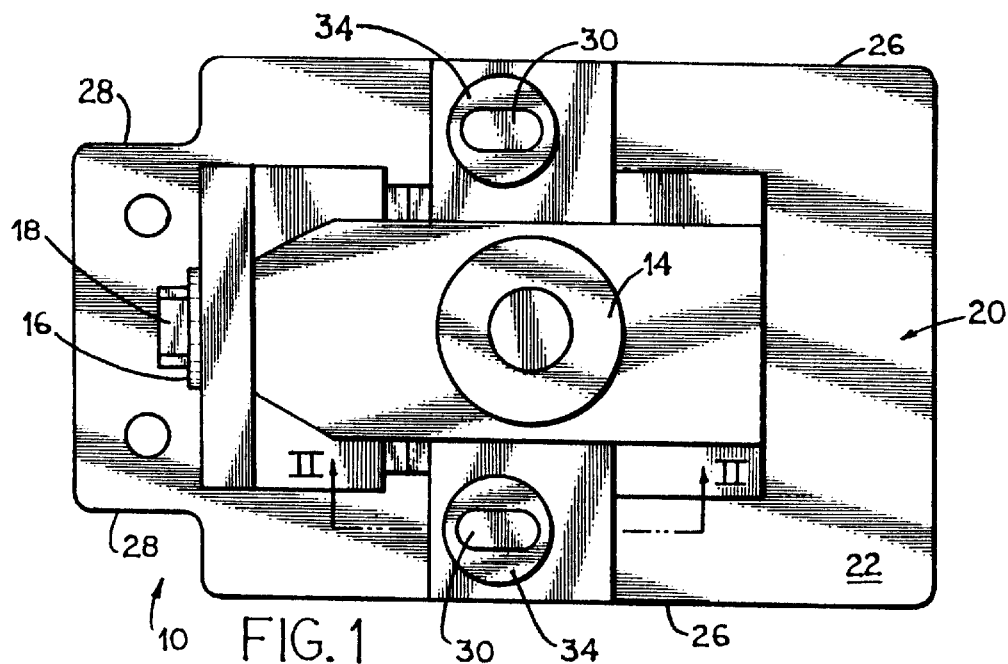
FIG. 1 is a top plan view of a machinery mount anchor base with which the drilling fixture of the invention is used.
Figure 2:
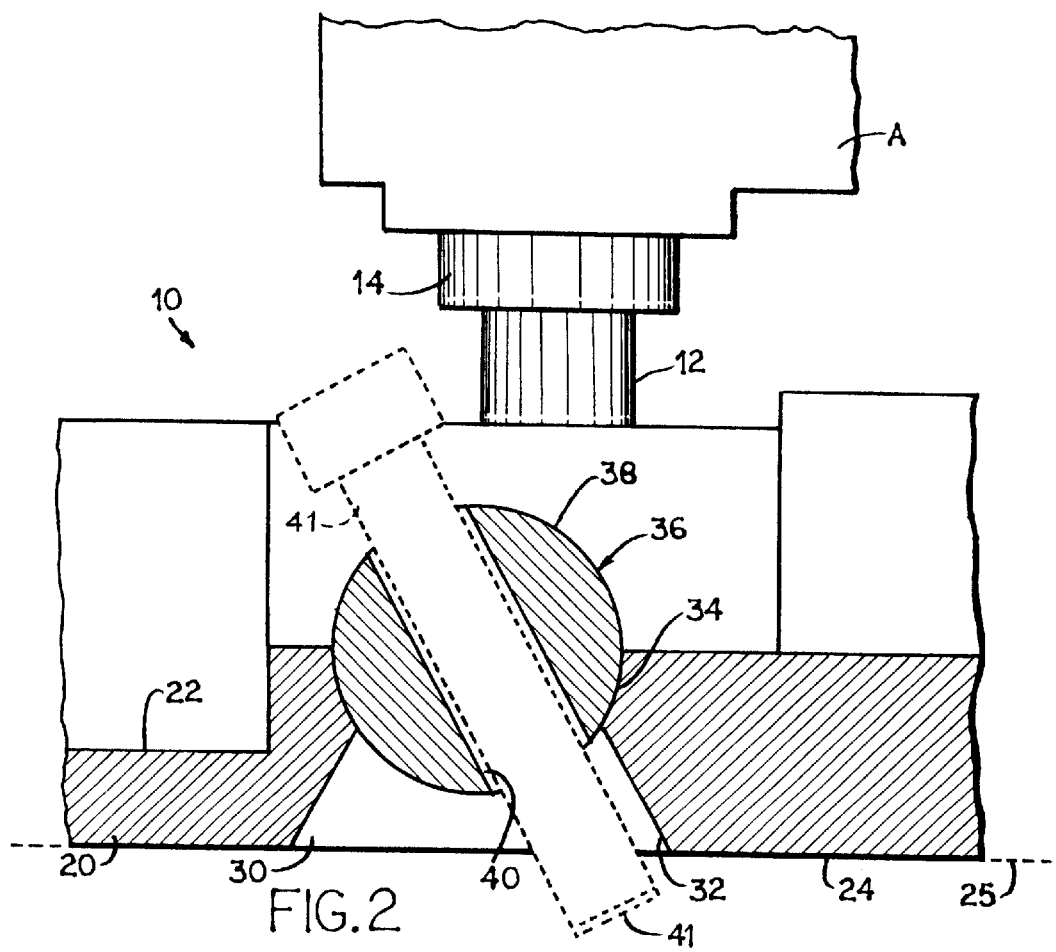
FIG. 2 is a side elevational partial sectional view of a machinery mount anchor base with which the drill fixture of the invention is used, the fixture fastener being represented in dotted lines.

In order to appreciate the environment in which the drill fixture of the invention is used, a typical machinery mount anchor base utilizing the invention is shown in FIGS. 1 and 2. This anchor base is of the FIXATOR type sold by the assignee and is described in the assignee's U.S. Pat. No. 5,971,349, and the following description sets forth the basic configuration and components of the anchor base, generally indicated at 10.

The anchor base 10 consists of several assembled components which include a vertically adjustable pedestal 12 having a cap 14 located at the upper end of the pedestal, and the height of the pedestal is adjusted by adjustment screw 16 having a hexagonal head 18 to which a wrench or socket head may be attached. Rotation of the screw 16 raises and lowers the pedestal 12 with respect to the anchor base plate 20 upon which the pedestal is mounted. The base plate 20 includes a top surface 22 and a lower surface 24, the lower surface 24 directly engages the supporting floor or foundation 25, FIG. 2, for the machine A being supported.

As appreciated from FIG. 1, the lateral edges of the base plate 20 are indicated at 26, while the lateral edges of the base plate projection are defined by the end edges 28.

The anchor base 10 is fixed in the desired position on the supporting floor or foundation 25 by fasteners extending through a pair of fastener openings 30 defined in the base plate 20 on opposite sides of the pedestal 12. Each of the fastener openings 30 formed in the base plate 20 include oblique walls 32 intersecting a spherical recess 34 in which a spherical ball alignment member or ball 36 is received. The member 36 includes the spherical outer surface 38 and a diametrical hole 40 formed in the member 36 will receive the threaded fastener 41 shown in dotted lines, FIG. 2, whereby the fastener 41 may be threaded into a hole in the supporting floor 25. It is the forming of this fastener receiving hole in floor 25 with which the drill fixture of the invention pertains.

Figure 5:
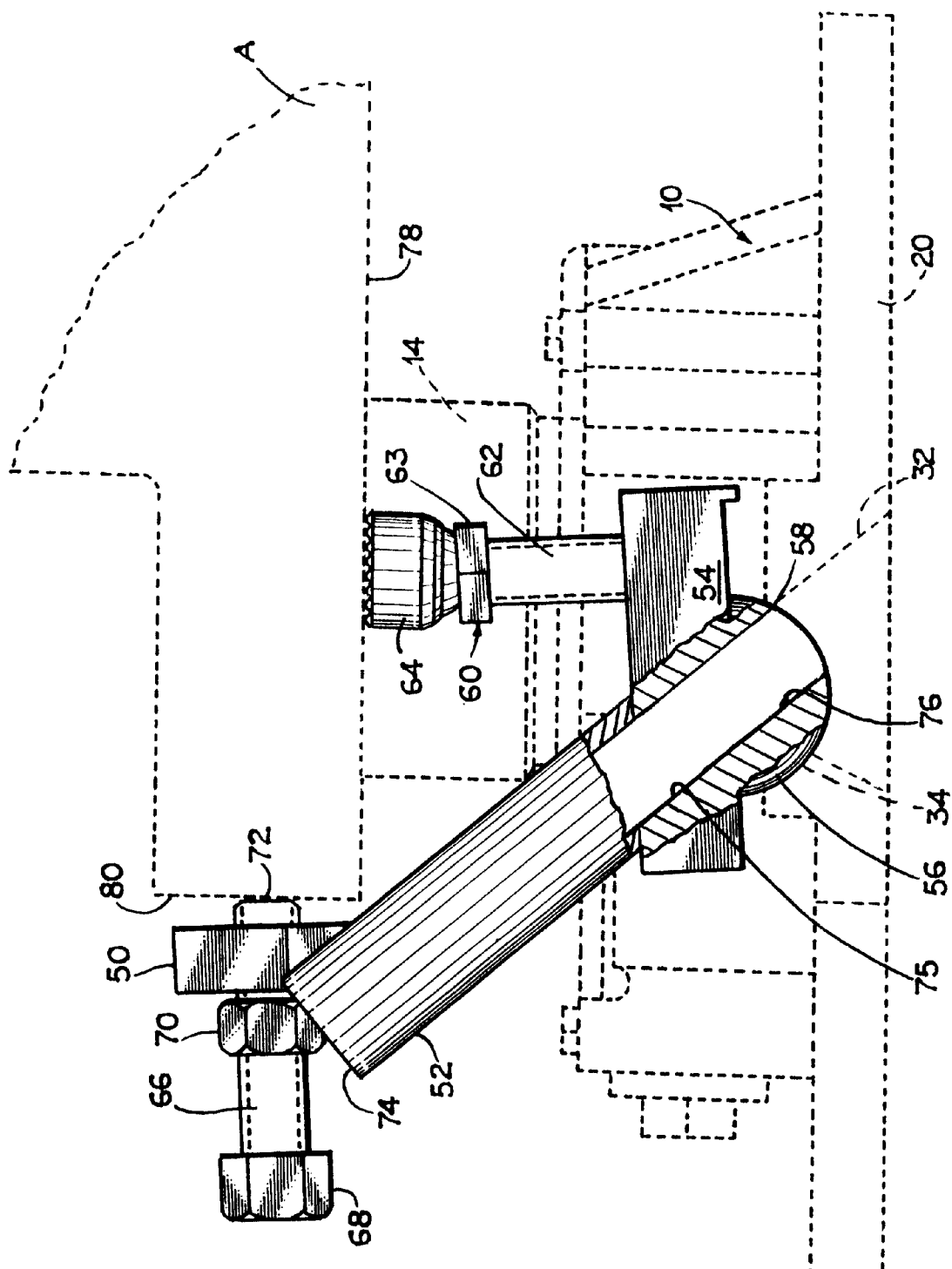
FIG. 5 is an elevational view of the drill fixture similar to FIG. 4 illustrating the fixture as mounted upon a machinery mount anchor base shown in dotted lines.

The drill fixture of the invention is shown in FIGS. 3–5 and is generally indicated at 44 and comprises a frame 46 consisting of a number of steel elements welded together. The frame 46 includes a lower bridge 48 and an upper bridge 50 which, at their ends, are attached to a pair of drill guides 52 which are of a cylindrical tubular configuration. The lower end of the drill guides 52 are affixed to rectangular end portions 54, and each of the end portions 54 includes a lower surface upon which a partially spherical projection 56 is formed as appreciated from FIG. 4. The projections 56 each include a spherical surface 58 which is identical in size to the anchor base recess 34. In this manner, the projections 56 are capable of being closely received within the recesses 34.

A vertically adjustable retainer 60 is mounted upon each of the end portions 54 and each retainer consists of a threaded shaft 62 received within a threaded hole defined in the associated end portion 54. Each threaded shaft 62 includes a hexagonal rim 63 and a head 64 is defined upon the upper end of the shaft for engagement with the machine A to be supported, as later described. Preferably, a self-aligning ball and socket connection is located between the shaft 62 and head 64 so that if, during use, a misalignment occurs between the axes of the shaft 62 and head 64, such misalignment will be automatically compensated.

The angular orientation of the drill fixture 44 during use is determined by the threaded angle adjustment shaft 66 received within a threaded hole defined in the upper bridge 50. The shaft 66 includes a hexagonal head 68 having a lock nut 70 defined thereon. The end of the threaded shaft 66 is represented at 72. As will be noted from FIG. 4, the length of shaft 66 is substantially perpendicular to the length of retainer shafts 62.

The drill guides 52 each have an open upper end 74 and as will be appreciated from FIG. 5, the bores 75 of the drill guides 52 extend through the aligned projections 56, hole 76, so that a drill located within a drill guide 52 will extend through the hole 76 defined in the aligned associated projection 56.

Operation and use of the drill fixture 44 is as follows:

Initially, machine A, which is to be supported, will be mounted upon a plurality of anchor bases 10. By operation of the adjustment screw 16, each anchor base pedestal 12 may be adjusted so that the weight of the machine A can be equally divided among the supporting anchors, and the weight of the machine A will be borne by the anchors 10.

Once the anchor bases 10 are properly located with respect to the supported machine A, the drill fixture 44 is placed on an anchor base 10. Initially, the retainer shafts 62 will be retracted into their threaded holes in the associated end portion 54, as shown in FIG. 4, and the angle adjustment shaft 66 will be retracted so that the shaft end 72 is only projecting slightly through the upper bridge 50 as shown in FIG. 4.

Thereupon, the drill fixture 44 may be placed upon the anchor base 10 in a manner which will be appreciated from FIG. 5. The end portions 54 will be located upon opposite sides of the pedestal 12 in such a manner that the spherical projections 56 will be received within the spherical recesses 34 defined in the base plate 20, FIG. 5. Thereupon, the shafts 62 of the retainers 60 are rotated to raise the heads 64. Such rotation of the shafts 62 can be accomplished by a wrench applied to the hexagonal shaft rim 63. The shaft 62 is unthreaded from its threaded hole in end portion 54 until the retainer head 64 engages the lower surface 78 of the machine A. Further upward movement of the heads 64 will firmly force the projections 56 into their associated recesses 34.

Prior to final tightening of the retainer shafts 62, the angle adjustment shaft 66 is rotated by a wrench attached to the hexagonal head 68. The shaft 66 is rotated within its threaded hole defined in upper bridge 50 so that the shaft outer end 72 will engage the vertical edge 80 of the machine A, and in this manner, engagement of the drill fixture 44 on the machine A at a location remote from that engaged by the retainers 60 is achieved.

Because the retainers 60 engage the machine A on the opposite side of the vertical plane passing through the center of the recesses 34 and projections 56 to that of the location of contact of the adjustment shaft 66 with the machine edge 80, rotation of the angle adjustment shaft 66 and raising and lowering the retainer shafts 62 will vary the angular orientation of the drill guides 52 to the vertical as the fixture 44 pivots in recesses 34. As will be appreciated from FIG. 5, the angular orientation of drill guides 52 should be such that the drill guides are as vertical as possible, yet will clear the outer lower edge of the machine A. Once the desired angular orientation of the drill guides 52 is achieved, the height of the retainers 60 will be finally tightened and the shaft 66 will be locked in its final position by means of the lock nut 70. Because the retainers 60 will firmly maintain the projections 56 in the recesses 34, and because the shaft 66 will prevent clockwise angular movement of the fixture 44, FIG. 5, the fixture 44 is now firmly mounted on the anchor base plate 20 in a positive manner. A rotating drill may now be inserted into a drill guide bore 75 through an open end 74, and pushed through the drill guide, the projection hole 76 and through the base plate fastener opening 30 so that drill may bore a fastener receiving hole in the supporting floor or foundation 25. As the drill, not shown, will be firmly supported within the drill guide bore 75, the drill will accurately bore a hole in the floor 25 at the predetermined angular orientation maintaining the drilled hole of an accurately sized configuration. Both drill guides 52 will be used to drill two fastener receiving openings in alignment with the openings 30. Thereafter, the angle adjustment shaft 66 is unlocked by backing off the lock nut 70, and the retainers 60 are threadedly retracted into their associated end portions 54. The drill fixture 44 can then be removed from the associated anchor base 10.

Installment of the anchor base fasteners 41 can now be achieved by placing the self-aligning members 36 within the spherical recesses 34 and the fastener 41 may now be threaded into the hole bored into the supporting floor 25, FIG. 2. The fastener 41 will usually be tightened against the alignment member 36. Once the fasteners 41 are fully tightened into the bored holes, the final adjustments of the anchor base 10 may now be achieved by rotation of the adjustment screw 16.

From the above description, it will be appreciated that the drill fixture 44 permits accurate holes to be drilled in the supporting surface 25 obliquely to the vertical to receive the fasteners 41, and the invention solves a difficult machine mounting procedure.

It is appreciated that various modifications to the inventive concepts may be apparent to those skilled in the art without departing from the spirit and scope of the invention.

What is claimed is:

1. A fixture for drilling holes to receive fasteners for a machine supporting mounting anchor mounted on a drillable surface wherein the anchor includes a pair of semi-spherical recessed fastener receiving openings, an opening being located on opposite sides of a pedestal defined on the anchor and the anchor pedestal engaging a lower surface of the machine being supported, the fixture comprising a frame, said frame including a bridge for bridging the anchor pedestal and having ends, each bridge end having a lower surface and an upper surface, a projection defined upon each bridge end lower surface adapted to be received within an anchor recessed fastener receiver opening, a vertically disposed retainer mounted upon each bridge end upper surface having an upper end adapted to engage a lower surface of the machine being supported, a tubular drill guide mounted upon each bridge end upper surface having a bore having open upper and lower ends and extending through the associated projection, and frame angle positioning means mounted on said frame adapted to engage with the machine being supported, said retainers and said angle positioning means being on opposite sides of the vertical projection of a plane passing through the centers of said projections whereby said frame may pivot about said projections within the anchor fastener receiving openings and compressive forces within said retainers and angle positioning means firmly pivotally position said frame relative to the anchor permitting said drill guide bores to receive and guide a drill drilling into the drillable surface for the machinery supporting mounting anchor.

2. In a fixture for drilling holes to receive fasteners as in claim 1, said projections being of a semi-spherical convex configuration complemental in shape and size to the anchor fastener receiving openings.

3. In a fixture for drilling holes to receive fasteners as in claim 1, said retainers being vertically adjustable to adjust the vertical force exerted on the associated bridge end and the force exerted by the associated projection on the associated anchor recessed openings.

4. In a fixture for drilling holes to receive fasteners as in claim 3, said frame angle positioning means comprising a substantially horizontal threaded bolt threaded into said frame bridge whereby rotation of said bolt angularly positions said drill guides to the vertical.

5. In a fixture for drilling holes to receive fasteners as in claim 2, said drill guide bores extending through the adjacent projection whereby the guide bore's open lower end communicates with the associated anchor recessed openings.

6. A fixture for drilling holes to receive fasteners for a machine supporting mounting anchor mounted on a drillable surface wherein the anchor includes a pair of semi-spherical recessed fastener receiving openings, an opening being located on opposite sides of a pedestal defined on the anchor and the anchor pedestal engaging a lower surface of the machine being supported, the fixture comprising an elongated frame adapted to be temporarily mounted upon the machinery supporting mounting anchor, said frame including a pair of spaced downwardly extending projections adapted to be received within the anchor recessed openings, a pair of spaced vertically adjustable retainers defined on said frame adapted to engage a lower surface of the machine being supported on opposite sides of the anchor pedestal, adjustable frame angle positioning means mounted on said frame adapted to engage the machine being supported, said angle positioning means being located on said frame relative to said retainers such that adjustment of said angle positioning means causes said frame to pivot in a vertical plane, adjustment of said retainers maintaining said frame projections within the anchor recessed openings, and a pair of spaced tubular drill guides mounted on said frame each having an open upper end and an open lower end extending through a frame projection.

7. In a fixture for drilling holes to receive fasteners as in claim 6, said projections being of a semi-spherical convex configuration complemental in shape and size to the anchor fastener receiving openings.

8. In a fixture for drilling holes to receive fasteners as in claim 6, said retainers and said angle positioning means including elongated rotatable threaded shafts.

\* \* \* \* \*